United States Patent
Semenov et al.

(10) Patent No.: US 11,505,195 B2
(45) Date of Patent: Nov. 22, 2022

(54) ONE-PEDAL DRIVE FILTERS AND RATE LIMITS OF POWERTRAIN TORQUE

(71) Applicant: FORD GLOBAL TECHNOLOGIES, LLC, Dearborn, MI (US)

(72) Inventors: Sergey Gennadievich Semenov, Farmington Hills, MI (US); Bryan Michael Bolger, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 17/035,066

(22) Filed: Sep. 28, 2020

(65) Prior Publication Data
US 2022/0097700 A1    Mar. 31, 2022

(51) Int. Cl.
| | |
|---|---|
| *B60W 30/188* | (2012.01) |
| *B60W 10/08* | (2006.01) |
| *B60W 10/18* | (2012.01) |
| *B60K 1/00* | (2006.01) |
| *B60K 26/02* | (2006.01) |
| *B60L 15/20* | (2006.01) |

(52) U.S. Cl.
CPC .............. *B60W 30/188* (2013.01); *B60K 1/00* (2013.01); *B60K 26/02* (2013.01); *B60L 15/2009* (2013.01); *B60W 10/08* (2013.01); *B60W 10/18* (2013.01); *B60K 2001/001* (2013.01); *B60K 2026/025* (2013.01); *B60K 2026/026* (2013.01); *B60W 2520/10* (2013.01); *B60W 2540/10* (2013.01)

(58) Field of Classification Search
CPC ........... B60W 30/188; B60W 2520/10; B60W 2540/10; B60W 10/08; B60W 10/18; B60K 1/00; B60K 26/02; B60K 2026/026; B60K 2026/025; B60K 2001/001; B60L 15/2009
See application file for complete search history.

(56) References Cited

U.S. PATENT DOCUMENTS

| | | |
|---|---|---|
| 9,126,591 B2 | 9/2015 | Johri et al. |
| 2011/0166730 A1* | 7/2011 | Wang ............... B60W 10/06 180/65.265 |

(Continued)

FOREIGN PATENT DOCUMENTS

KR    101618453 B1    5/2016

*Primary Examiner* — Tisha D Lewis
(74) *Attorney, Agent, or Firm* — Vincent Mastrogiacomo; Brooks Kushman P.C.

(57) ABSTRACT

A vehicle includes a powertrain having an electric machine configured to power driven wheels, an accelerator pedal, and a brake pedal. A controller is programmed to, in response to driver-demanded torque corresponding to a position of the accelerator pedal, selectively brake the vehicle via operation of the electric machine, in further response to a speed of the vehicle being greater than a threshold, limit a rate of change of the driver-demanded torque commanded to the powertrain based on a first rate limit, and, in further response to the speed being less than another threshold, limit a rate of change of the driver-demanded torque commanded to the powertrain based on a second rate limit that is higher than the first rate limit such that, for a given driver-demanded torque, acceleration and deceleration of the vehicle is more responsive than when the first rate limit is applied.

20 Claims, 3 Drawing Sheets

(56) References Cited

U.S. PATENT DOCUMENTS

| | | | |
|---|---|---|---|
| 2015/0066265 A1* | 3/2015 | Martin | B60W 30/1882 477/3 |
| 2015/0197233 A1* | 7/2015 | Martin | B60W 20/10 180/65.265 |
| 2019/0106103 A1 | 4/2019 | Inoue et al. | |

* cited by examiner

ONE-PEDAL DRIVE FILTERS AND RATE LIMITS OF POWERTRAIN TORQUE

TECHNICAL FIELD

This disclosure relates to electric vehicles having a one-pedal driving mode and more specifically to the filtering and rate limiting of raw driver-demanded torque.

BACKGROUND

Electrified vehicles, such as fully electric and hybrid electric vehicles, include at least one electric machine for propelling the vehicle. The electric machine is powered by a traction battery that supplies energy to the electric machine, which reduces a state of charge (SOC) of the battery. Many electrified vehicles are capable of regenerative braking to recharge the battery by converting mechanical power into electrical power.

SUMMARY

According to one embodiment, a vehicle includes a powertrain having an electric machine configured to power driven wheels, an accelerator pedal, and a brake pedal. A controller is programmed to, in response to driver-demanded torque corresponding to a position of the accelerator pedal, selectively brake the vehicle via operation of the electric machine, in further response to a speed of the vehicle being greater than a threshold, limit a rate of change of the driver-demanded torque commanded to the powertrain based on a first rate limit, and, in further response to the speed being less than another threshold, limit a rate of change of the driver-demanded torque commanded to the powertrain based on a second rate limit that is higher than the first rate limit such that, for a given driver-demanded torque, acceleration and deceleration of the vehicle is more responsive than when the first rate limit is applied.

According to another embodiment, a method of rate limiting a driver-demanded torque of a vehicle during a one-pedal drive mode includes selectively braking a vehicle via operation of an electric machine according to a driver-demanded torque that is based on a position of the accelerator pedal; in response to a speed of the vehicle being greater than a threshold, limiting a rate of change of the driver-demanded torque commanded to a powertrain based on a first rate limit; and in response to the speed being less than another threshold, limiting a rate of change of the driver-demanded torque commanded to the powertrain based on a second rate limit that is higher than the first rate limit such that, for a given driver-demanded torque, acceleration and deceleration of the vehicle is more responsive than when the first rate limit is applied.

According to yet another embodiment, a vehicle includes a powertrain having an electric machine configured to power driven wheels, an accelerator pedal, and a brake pedal, A vehicle controller is programmed to, in response to driver-demanded torque corresponding to a position of the accelerator pedal, selectively brake the vehicle via operation of the electric machine, and when a speed of the vehicle is greater than a threshold, limit a rate of change of the driver-demanded torque commanded to the powertrain based on a first rate limit, and when the speed is less than another threshold, limit a rate of change of the driver-demanded torque commanded to the powertrain based on a second rate limit that is higher than the first rate limit such that, for a given driver-demanded torque, acceleration and deceleration of the vehicle is more responsive than when the first rate limit is applied.

DETAILED DESCRIPTION

Figure 1:
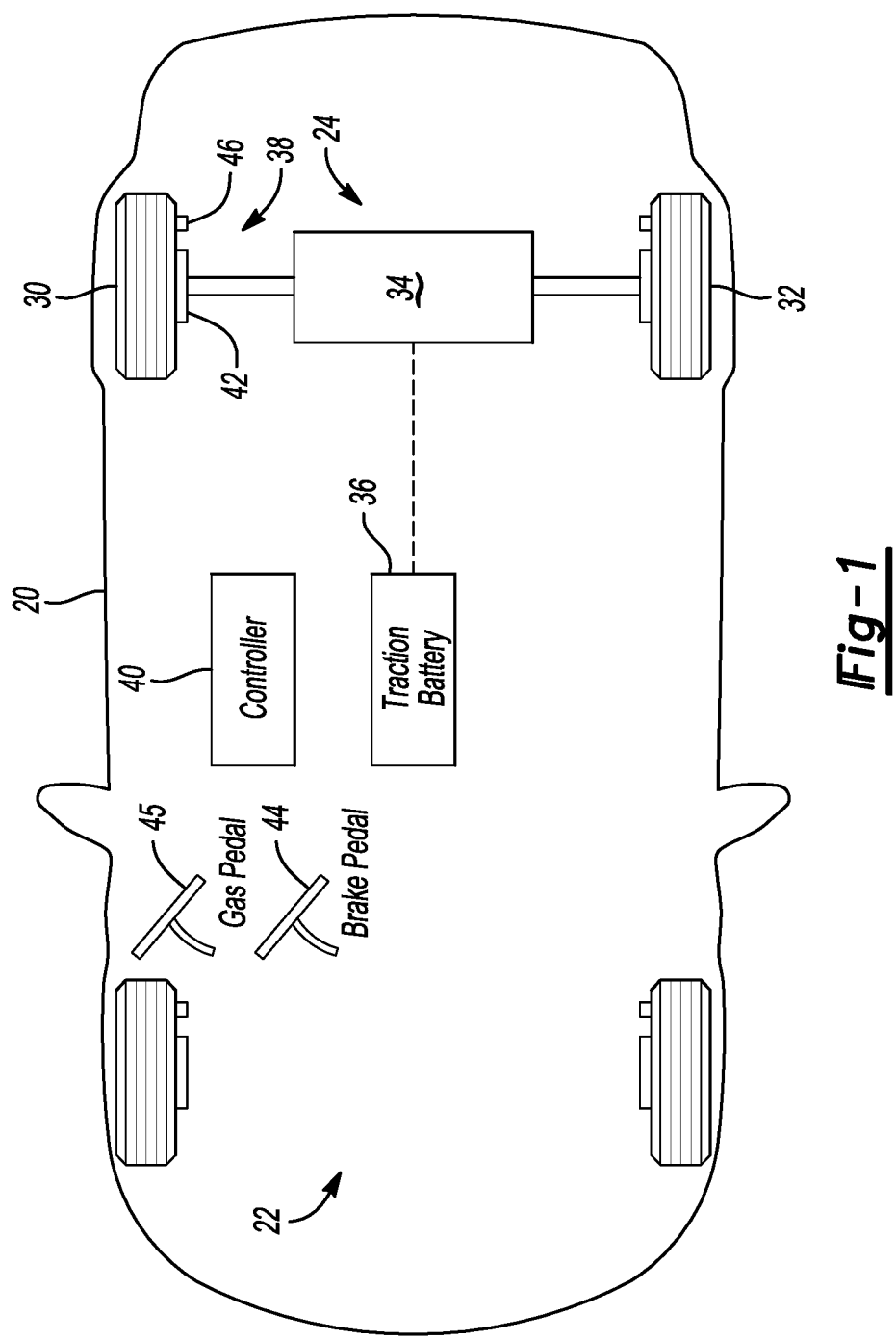
FIG. 1 illustrates a schematic diagram of an example electrified vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Traditionally, drivers controlled the vehicle speed by modulating the accelerator and brake pedals. The driver depresses the accelerator pedal to go faster and applies the brake pedal to slow down. Modern vehicles present an opportunity for an alternative control called one-pedal driving (one-pedal driving mode) in which the vehicle can be controlled using only the accelerator pedal to both accelerate and decelerate the vehicle. In the one-pedal driving mode, the driver commands a raw driver-demanded wheel torque by actuating the accelerator pedal. Depending upon the vehicle speed and the accelerator pedal position the raw driver-demanded torque may be a positive value or a negative value. A positive value indicates a propulsion torque, whereas a negative value indicates a braking torque. (A negative driver-demanded torque may be also be referred to herein as "a target braking torque."). The vehicle may provide the target braking torque using either the powertrain, e.g. regenerative braking, the friction brakes, or a combination of both.

The raw driver-demanded torque is filtered and rate limited to smooth the acceleration and deceleration of the vehicle. Once filtered and rate limited, the torque may be referred to as a "commanded wheel torque." The rate limit constrains the step change between the previous commanded wheel torque and the subsequent commanded wheel torque. The vehicle may be programmed with a plurality of different filters and rate limits that are applied in difference situations. For example, different filters and rate limits may be used depending upon the vehicle speed, e.g., a lower rate limit may be used when the vehicle is at low speed and a higher rate limit may be used when the vehicle is at high speeds. (A higher rate limit permits a larger step change than a lower rate limit.) Different filters and rate limits may also be used based on the mode of the vehicle. That is, the vehicle may include a set of rate limits and filters when the vehicle is in a two-pedal drive mode and may use a another set of rate limits and filters when the vehicle is in a one-pedal drive mode. The standard filters and rate limits may be associated with a standard low-speed controller (SLSC). When the vehicle is in the one-pedal drive mode, additional different filters and rate limits may be used depending upon whether or not the brake pedal is applied by the driver.

The one-pedal drive mode may be configured to bring the vehicle to a complete stop when the driver has released the accelerator pedal without application of the brake pedal. The vehicle may be stopped using regenerative braking, friction braking, or both. Once the vehicle is stopped, the friction brakes may be applied to hold the vehicle stationary. The vehicle may include a one-pedal drive low-speed controller (1PLSC) that controls the vehicle to a complete stop from low speeds by adjusting the raw driver-demanded torque when the vehicle is in the one-pedal drive mode and the driver has fully released the accelerator pedal.

In a vehicle with one-pedal drive, standard filters and rate limits used during two-pedal mode may not yield acceptable performance. At low speeds and accelerator pedal inputs, the raw driver-demanded torque is typically heavily filtered and rate limited by the SLSC to improve drivability. These drivability filters on the raw driver-demanded torque limit the immediacy of response of the SLSC and may degrade stopping performance if used during the one-pedal mode. If those filters are not faster, the filtered driver-demanded torque may take too long to blend from negative stopping torque to zero and the vehicle may experience rollback at the end of the stop in one-pedal mode. Similarly, using the existing torque modification filters could lead to issues while transitioning into and out of one-pedal friction brake requests. If the filters are too fast upon friction application, there may be powertrain bumps in response to the friction brakes and/or rollback at the end of the stop on grades. If the filters are too slow upon friction release, there may be slow powertrain response and rollback when launching up a grade. These and other problems are addressed by the controls and methods discussed below.

When one-pedal mode is active, the powertrain controls use the unique set of drivability filters and rate limits for the raw driver-demand request when the driver is in control. These include filter constants and rate limits for increasing torque and decreasing torque in the selected gear direction. For example, when the vehicle is in DRIVE, the increasing torque means going from zero to a higher positive torque in forward direction, or going from torque in reverse direction to zero. The 1PLSC may include two sets of positive filter constants and rate limits: (1) a filter constant and rate limit when brake pedal is not applied, and (2) a filter constant and rate limit when brake pedal is applied. If the 1PLSC feedback control is active without the brake pedal applied, then the ordinary increasing filter constant and rate limit of the SLSC are clipped from below by the 1PLSC filter constant and rate limit. These values are set to allow faster response and rate limiting than the ordinary driver-demand.

If the brake pedal is applied in a low-speed region while the 1PLSP is active, then the increasing filter constant and rate limit is additionally clipped from below by the second unique set of filter constant and rate limit. These values are set to allow faster filtering and rate limiting than both the ordinary driver-demand filters and 1PLSC filter constant and rate limit that are used when the brakes are not applied. When the brake pedal is applied, the vehicle speed can approach zero much faster than when the 1PLSC performs the stop, so the filters and rate limits need to be very fast to ensure the powertrain torque is not still increasing from a negative value up to zero when the vehicle has already reached a stop.

When the friction brakes are requested in the one-pedal mode, for a duration thereafter, another set of filter constants and rate limits may be used. These filter constants and rate limits are on the torque modification, i.e., the amount of cancellation of friction torque has over powertrain torque. The vehicle may include two sets of unique calibrations: (1) torque modification filters and rate limits while the brakes are being applied, and (2) torque modification filters and rate limits while the brakes are being released. To affect the torque modification during the application of friction brakes, the original negative filter constant and rate limit are clipped with a unique slow filter constant and rate limit. The torque modification application filters and rate limits are set slower to prevent powertrain bumps in response to the friction brakes and/or rollback at the end of the stop on grades. To affect torque modification during the release of the friction brakes, the positive filter constant and rate limit are clipped with a unique faster filter constant and rate limit. The torque modification release filter constant and rate limit are set faster to prevent slow powertrain response and rollback when launching up a grade.

Referring to FIG. 1, an electrified vehicle 20 is illustrated as a fully electric vehicle but, in other embodiments, the vehicle 20 may be a hybrid-electric vehicle that includes an internal-combustion engine. The vehicle 20 is shown as being two-wheel drive (such as front-wheel drive or rear-wheel drive), but may be all-wheel drive (AWD) in other embodiments. The vehicle 20 may include a powertrain 24 including a powerplant, e.g., an electric machine 34, capable of operating to accelerate (propel) or brake the vehicle 20.

The electric machine 34 is operably coupled to driven wheels 30 and 32. A gearbox (not shown) may be included to change a speed ratio between the electric machine 34 and the wheels 30, 32. The electric machine may be one or more electric machines. The electric machine 34 is capable of acting as motor to provide a positive torque to propel the vehicle 20 and is capable of acting as a generator to provide a negative torque to brake the vehicle such as via regenerative braking. The electric machine 34 may be a permanent magnet three-phase alternating current (AC) electric motor or other suitable type.

The electric machine 34 is powered by one or more traction batteries, such as traction battery 36. The traction battery 36 stores energy that can be used by the electric machine 34. The traction battery 36 typically provides a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally regulated with a thermal management system.

The traction battery 36 may be electrically connected to one or more power-electronics modules through one or more contactors. The module may be electrically connected to the electric machine 34 and may provide the ability to bi-directionally transfer electrical energy between the traction battery 36 and the electric machine 34. For example, a typical traction battery 36 may provide a DC voltage while the electric machine 34 may require a three-phase AC. The power-electronics module may convert the DC voltage to a three-phase AC voltage as required by the electric machines. In a generator mode, which may be during regenerative braking, the power-electronics module may convert the three-phase AC voltage from the electric machine 34 acting as a generator to the DC voltage required by the traction battery 36.

The vehicle 20 includes a controller 40 in electric communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables" that are based on calculations and test data, and are stored within the memory. The controller 40 may communicate with other vehicle systems and controllers over one or more wired or wireless vehicle connections using common bus protocols (e.g., CAN and LIN). Used herein, any reference to "a controller" refers to one or more controllers. The controller 40 may include battery energy control module (BECM) that operates at least the traction battery, a powertrain control module (PCM) that operates at least the electric machine, and an ABS control module that controls the anti-lock braking system (ABS) 38.

The controllers communicate with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by a controller within each of the subsystems identified above.

The ABS 38 may be a hydraulic system, an electric system, or a combination of electric and hydraulic. The ABS 38 may be controlled by the ABS control module of the controller 40. The ABS 38 may include a brake module and a plurality of friction brakes 42 located at each of the wheels. Modern vehicles typically have disc brakes; however, other types of friction brakes are available, such as drum brakes. In an example embodiment, each of the brakes 42 are in fluid communication with the brake module via a brake line configured to deliver fluid pressure from the module to a caliper of the brakes 42. The module may include a plurality of valves configured to provide independent fluid pressure to each of the brakes 42. The brake module may be controlled by operation of a brake pedal 44 and/or by the vehicle controller 40 without input from the driver. The ABS system 38 also includes associated wheel-speed sensors 46 each located at one of the wheels. Each sensor 46 is configured to output a wheel-speed signal to the controller 40 indicative of a measured wheel speed.

The vehicle 20 is configured to brake using powertrain braking (e.g., regenerative braking), friction braking, or a combination thereof. The ABS control module includes programming for aggregating a demanded braking torque between the electric machine 34 and the friction brakes 42. The demanded braking torque may be based on driver input, e.g., a position of the brake pedal 44, or by the controller 40 in a two-pedal driving mode. The aggregator may be programmed to slow the vehicle using regenerative braking whenever possible and apply the friction brakes 42 when necessary.

The vehicle 20 includes an accelerator pedal 45. The accelerator pedal 45 includes a range of travel from a released position to a fully depressed position and indeterminate positions therebetween. The released position may be considered a zero percent position and the fully depressed position may be considered a 100 percent position. Releasing the pedal may be referred to as decreasing the accelerator pedal position, and applying the pedal may be referred to as increasing the accelerator pedal position. The accelerator pedal 45 includes an associated sensor (not shown) that senses the position of the pedal 45. The sensor is configured to output a pedal-position signal to the controller 40 that is indicative of a sensed position of the pedal 45, i.e., an accelerator pedal position. The accelerator pedal 45 is used by the driver to command a desired speed and torque of the vehicle. That is, the accelerator pedal 45 is used by the driver to set a raw driver-demanded wheel torque. The driver-demanded torque may be a positive value or a negative value as discussed above.

The controller 40 may be programmed to receive the pedal-position signal and determine the raw driver-demanded torque based on pedal position and other factors such as vehicle speed according to stored mapping. During a one-pedal driving mode, the accelerator pedal is used to set a target vehicle propulsion torque when the driver-demanded torque is positive was well as a target braking torque when the driver-demanded torque is negative. The controller 40 may include multiple lookup tables or maps for determining the raw driver-demanded torque. These maps indicate the raw driver-demanded torque based on inputs such as accelerator pedal position, vehicle speed, and other factors. Different maps may be used in different drive modes. For example, one or more maps may be use when the vehicle is in a two-pedal driving mode and another map may be used when the vehicle is in a one-pedal driving mode. The maps associated with the one-pedal drive mode may include more aggressive negative driver-demanded torque values so that the vehicle is braked (powertrain, friction, or both) in response to the accelerator pedal being released so that application of the brake pedal is unnecessary in most situations.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 2:
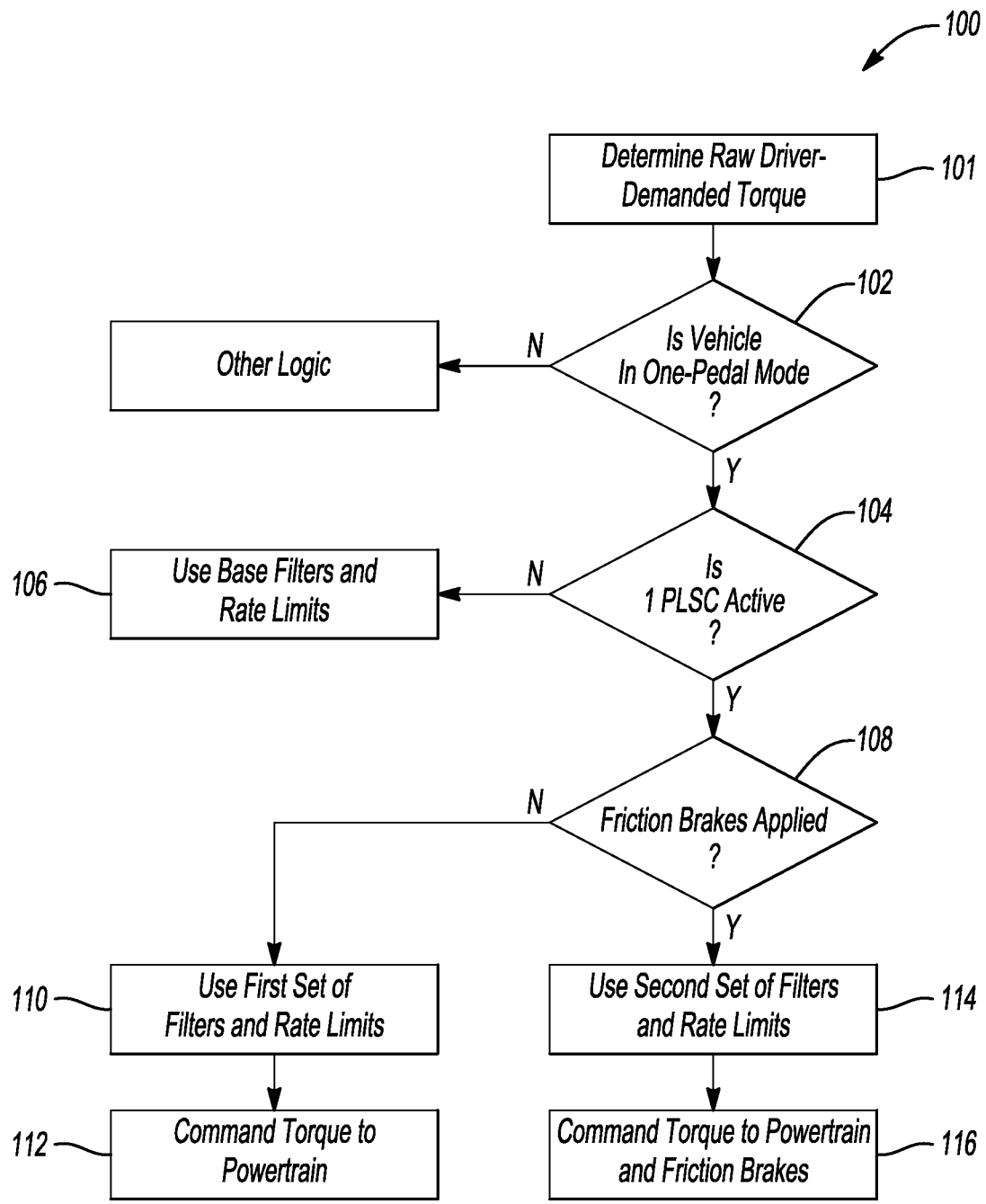
FIG. 2 is a flowchart of an algorithm for rate limiting and filtering driver-demanded torque during a one-pedal mode.

FIG. 2 is a flowchart 100 of an algorithm for controlling powertrain torque commands during a one-pedal drive mode. At operation 101, the controller determines a raw driver-demanded torque. The controller then determines if the vehicle is in a one-pedal drive mode at operation 102. If no, control passes to other logic. If yes, control passes operation 104 and the controller determines if the 1PLSC is active. The activation state of the 1PLSC may be a function of vehicle speed, the accelerator pedal position, and other factors. If the 1PLSC is in active, control passes to operation 106 and the controller uses base filter(s) and rate limit(s) of the one-pedal mode. If the 1PLSC is active, control passes to operation 108 to determine if the friction brakes are applied. If the friction brakes are not applied, the controller uses a first set of filter(s) and rate limit(s) to shape the raw driver-demanded torque into a final wheel torque command at operation 110. In one example embodiment, the filter constant may be 0.07 and the rate limit may be 5000 Newton-meters per second. Other values may be used in other embodiments. These filters/rate limits may be higher than the base filters/rate limits of operation 106. At operation 112, the controller commands the final wheel torque to the powertrain. The powertrain controller then arbitrates the final wheel torque between the electric machine and the friction brakes if needed. This arbitration is described in applicant's co-pending application, U.S. Ser. No. 17/035,035 filed on Sep. 28, 2020, the contents of which are hereby incorporated by reference in their entirety herein.

If the friction brakes are applied, the second set of filters and rate limits are used to shape the torque at operation 114. The second set of filters and rate limits are higher than the first set allowing for faster responsiveness. In one example embodiment, the filter constant may be 0.12 and the rate limit may be 10,000 Newton-meters per second. Other values may be used in other embodiments. At operation 116, the final wheel torque is commanded to the powertrain and the friction brakes.

Figure 3:
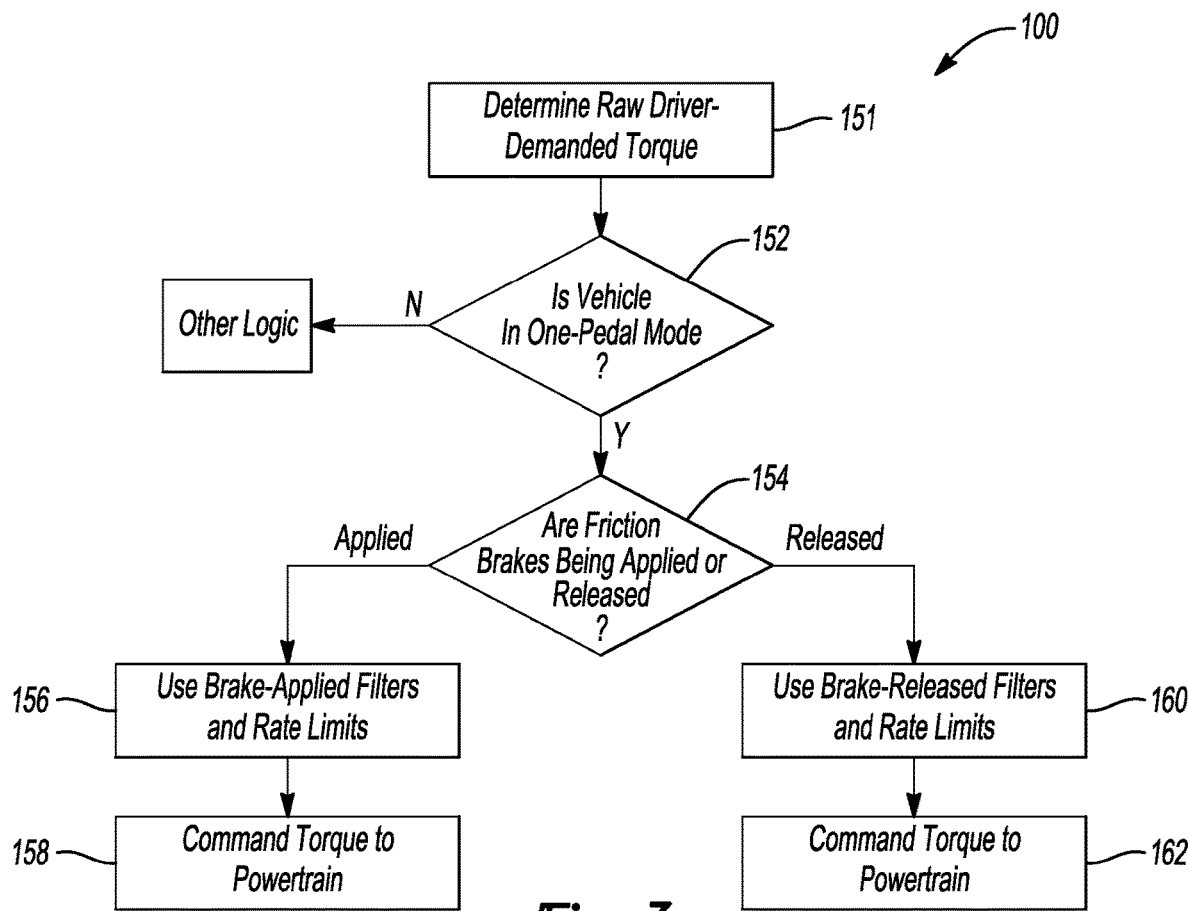
FIG. 3 is a flowchart of an algorithm for torque modification of the powertrain during the one-pedal mode.

FIG. 3 is a flowchart 150 of an algorithm for controlling torque modification during a one-pedal drive mode. As discussed above, two unique sets of calibrations may be used: first when the one-pedal brakes are being applied, and a second when the one-pedal brakes are being released.

At operation 151, the controller determines a raw driver-demanded torque. The controller then determines if the vehicle is in a one-pedal drive mode at operation 152. If no, control passes to other logic. If yes, control passes operation 154 and the controller determines if the friction brakes are being applied or released. If applied, control passes to operation 156. At operation 156, the controller may use the brake-applied filter(s) and rate limit(s) for modifying the torque. In operation 156, the controller may use the minimum of the normal negative torque modification filter/limit or the brake-applied filter/limit. The modified torque is then commanded to the powertrain at operation 158. If the brakes are being released, control passes to operation 158. At operation 158, the controller may use the brake release filter(s) and rate limit(s). In operation 158, the controller may use the maximum of the normal positive torque modification filters and rate limits and the brake-release filters and rate limits. At operation 160, the modified torque is commanded to the powertrain.

Figure 4:
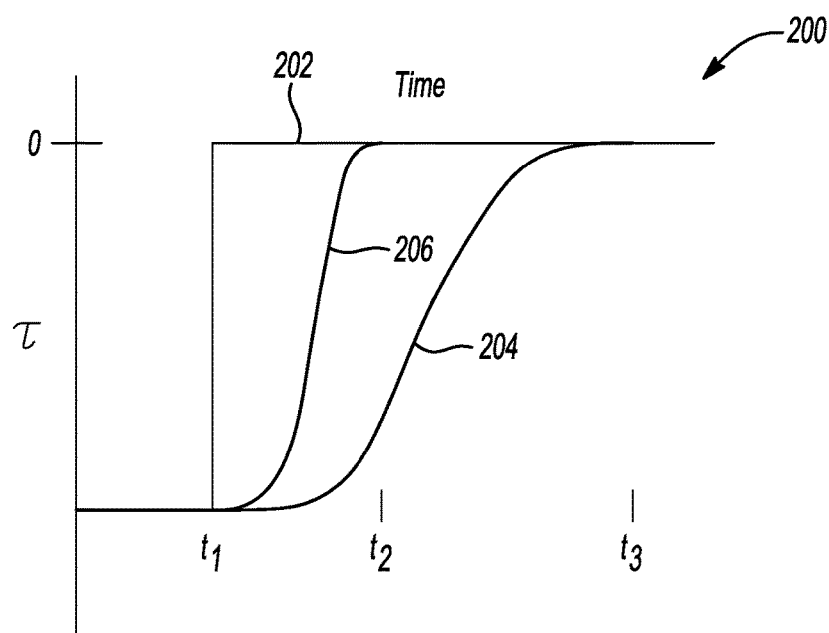
FIG. 4 is a series of plots illustrating the different rate limits applied by the standard low-speed controller and the one-pedal low-speed controller.

FIG. 4 illustrates example plots 200 showing the effects of the various rate limits in filters one applied to a raw driver-demanded torque 202. In this example, the powertrain is providing braking and thus the driver-demanded torque 202 has negative values. At time T1, raw driver-demanded torque changes to zero as the vehicle comes to a stop. The raw torque 202 abruptly changes from a negative torque to zero in a very short amount of time. If the vehicle were to command such an abrupt change in torque to the powertrain, jerkiness and other disturbances may result. To avoid this, rate limits and filters are applied to the raw driver-demanded torque to produce the final torque command to the powertrain. Plot 204 illustrates the shaped torque when a rate limit and filter of the SLSC is applied. These filter and rate limit are fairly low and result in a relatively lengthy delay of the commanded torque becoming zero. As explained above, this delay can cause problems when in the one-pedal mode. Plot 206 illustrates the shaped torque when a rate limit and filter of the 1PLSC is used. The rate limit of plot 206 is substantially higher than the rate limit of plot 204 resulting in the commanded torque becoming zero at time T2. This results in a more responsive powertrain that enables the vehicle to come to a stop sooner compared to the SLSC.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle comprising:
  a powertrain including an electric machine configured to power driven wheels;
  an accelerator pedal;
  a brake pedal; and a controller programmed to, in response to driver-demanded torque corresponding to a position of the accelerator pedal, selectively brake the vehicle via operation of the electric machine, and in further response to a speed of the vehicle being greater than a threshold, limit a rate of change of the driver-demanded torque commanded to the powertrain based on a first rate limit, and in further response to the speed being less than another threshold, limit a rate of change of the driver-demanded torque commanded to the powertrain based on a second rate limit that is higher than the first rate limit such that, for a given driver-demanded torque, acceleration and deceleration of the vehicle is more responsive than when the first rate limit is applied.

2. The vehicle of claim 1, wherein the controller is programmed to, in further response to the speed being less than the another threshold and the brake pedal being pressed, limit a rate of change of the driver-demanded torque commanded to the powertrain based on a third rate limit that is higher than the second rate limit such that, for a given driver-demanded torque, acceleration and deceleration of the vehicle is more responsive than when the first and second rate limits are applied.

3. The vehicle of claim 2, wherein the third rate limit is between 1.1 to 2.3 times larger than the second rate limit.

4. The vehicle of claim 2, wherein the controller is further programmed to, further in response to the vehicle being stationary and friction brakes being applied, limit a rate of change of the driver-demanded torque commanded to the powertrain based on a fourth rate limit.

5. The vehicle of claim 4, wherein the controller is further programmed to, further in response to the vehicle being stationary and friction brakes being actively released, limit a rate of change of the driver-demanded torque commanded to the powertrain based on a fifth rate limit.

6. The vehicle of claim 1, wherein the controller includes a high-speed controller that includes the first rate limit, and a low-speed controller that includes the second rate limit.

7. The vehicle of claim 1, wherein the driver-demanded torque is further based on a speed of the vehicle.

8. A method of rate limiting a driver-demanded torque of a vehicle during a one-pedal drive mode comprising:

selectively braking a vehicle via operation of an electric machine according to a driver-demanded torque that is based on a position of an accelerator pedal;

in response to a speed of the vehicle being greater than a threshold, limiting a rate of change of the driver-demanded torque commanded to a powertrain based on a first rate limit; and in response to the speed being less than another threshold, limiting a rate of change of the driver-demanded torque commanded to the powertrain based on a second rate limit that is higher than the first rate limit such that, for a given driver-demanded torque, acceleration and deceleration of the vehicle is more responsive than when the first rate limit is applied.

9. The method of claim 8 further comprising in further response to the speed being less than the another threshold and a brake pedal being pressed, limit a rate of change of the driver-demanded torque commanded to the powertrain based on a third rate limit that is higher than the second rate limit such that, for a given driver-demanded torque, acceleration and deceleration of the vehicle is more responsive than when the first and second rate limits are applied.

10. The method of claim 9 further comprising, in response to the vehicle being stationary and friction brakes being applied, limiting a rate of change of the driver-demanded torque commanded to the powertrain based on a fourth rate limit.

11. The method of claim 10 further comprising, in response to the vehicle being stationary and friction brakes being actively released, limit a rate of change of the driver-demanded torque commanded to the powertrain based on a fifth rate limit.

12. The method of claim 8 further comprising, in response to the vehicle being stationary and friction brakes being actively released, limit a rate of change of the driver-demanded torque commanded to the powertrain based on a third rate limit.

13. The method of claim 8, wherein the driver-demanded torque is further based on a speed of the vehicle.

14. The method of claim 9, wherein the third rate limit is between 1.1 to 2.3 times larger than the second rate limit.

15. A vehicle having one-pedal drive mode, the vehicle comprising:

a powertrain including an electric machine configured to power driven wheels;

an accelerator pedal;

a brake pedal; and a controller programmed to, in response to driver-demanded torque corresponding to a position of the accelerator pedal, selectively brake the vehicle via operation of the electric machine, and when a speed of the vehicle is greater than a threshold, limit a rate of change of the driver-demanded torque commanded to the powertrain based on a first rate limit, and when the speed is less than another threshold, limit a rate of change of the driver-demanded torque commanded to the powertrain based on a second rate limit that is higher than the first rate limit such that, for a given driver-demanded torque, acceleration and deceleration of the vehicle is more responsive than when the first rate limit is applied.

16. The vehicle of claim 15, wherein the controller is further programmed to, when the speed being less than the another threshold and the brake pedal is pressed, limit a rate of change of the driver-demanded torque commanded to the powertrain based on a third rate limit that is higher than the second rate limit such that, for a given driver-demanded torque, acceleration and deceleration of the vehicle is more responsive than when the first and second rate limits are applied.

17. The vehicle of claim 16, wherein the controller is further programmed to, when the vehicle is stationary and friction brakes are applied, limit a rate of change of the driver-demanded torque commanded to the powertrain based on a fourth rate limit.

18. The vehicle of claim 17, wherein the controller is further programmed to, when the vehicle is stationary and friction brakes are being actively released, limit a rate of change of the driver-demanded torque commanded to the powertrain based on a fifth rate limit.

19. The vehicle of claim 16, wherein the controller is further programmed to, when the vehicle is stationary and friction brakes are being actively released, limit a rate of change of the driver-demanded torque commanded to the powertrain based on a fourth rate limit.

20. The vehicle of claim 15, wherein the driver-demanded torque is further based on a speed of the vehicle.

\* \* \* \* \*